MAGNETIC TAPE CASSETTE PLAYER APPARATUS

Filed May 21, 1968 2 Sheets-Sheet 1

INVENTOR
CHARLES F. ROSE
BY Eugene M. Whitacre
ATTORNEY

Oct. 6, 1970 C. F. ROSE 3,532,293

MAGNETIC TAPE CASSETTE PLAYER APPARATUS

Filed May 21, 1968 2 Sheets-Sheet 2

INVENTOR
CHARLES F. ROSE

BY Eugene M. Whitacre
ATTORNEY

United States Patent Office 3,532,293
Patented Oct. 6, 1970

3,532,293
MAGNETIC TAPE CASSETTE PLAYER APPARATUS

Charles F. Rose, Indianapolis, Ind., assignor to RCA Corporation, a corporation of Delaware Filed May 21, 1968, Ser. No. 730,814
Int. Cl. G03b *1/04*; G11b *15/32, 23/04*
U.S. Cl. 242—200 5 Claims

ABSTRACT OF THE DISCLOSURE

A player apparatus of the type operable with a magnetic tape cassette is provided with means frictionally coupled to the supply turntable thereof in a manner so as to cause a drag or rotation retarding force to be applied to said supply turntable only during record or playback operation of said player apparatus.

This inveition relates to magnetic tape players and more particularly to magnetic tape players of the type adapted for use with a reel to reel tape cartridge or "cassette."

To obtain proper tape guiding in tape player apparatus, it is necessary to provide tension on the tape before it gets to the tape guide preceeding the play-record head. If proper guiding is not realized, the tape takeup winding, high frequency response, and wow and flutter performance characteristics of the player apparatus may be undesirably affected. On most "reel to reel" tape players including those adapted for use with reel to reel cartridges of the type described in U.S. Pat. No's. 3,027,110, 3,027,111 and 3,259,331, assigned to the Radio Corporation of America, proper tape guiding and tensioning is accomplished by a pressure pad positioned so as to urge the tape against an erase head positioned in the tape path prior to its passing said tape guide.

There have recently become available, player apparatus designed for operation and use with miniature reel to reel tape cartridges (hereinafter referred to as miniature cassettes) similar to that which is described in the above-noted United States Patents. In such apparatus, tape guides are provided adjacent the leading edge of the erase head housing and the trailing edge of the play-record head housing. However, because of limitations in the design of the miniaturized cassette itself, there is no way to apply a pressure pad to the erase head and no tape guide between the erase and play heads. Therefore, to obtain proper tape guiding and tension, a drag must be provided at the supply reel of the miniature cassette. One system for providing the required tape tension is in the use of a separate motor or pulley drive system to apply a retarding torque on the player's supply turntable receiving the cassettes supply reel during playback and record operation. This tends to increase both the complexity of the player mechanism and the cost of the apparatus.

It is an object of the present invention to provide an improved miniature cassette player apparatus.

It is another object of the present invention to provide a miniature cassette player apparatus having means effective in producing a drag on the supply reel of a received cassette during playback and record operation only and allowing said supply reel to turn freely during fast forward and reverse operation.

It is a further object of the present invention to provide a tape tension system for a miniature cassette receiving tape player apparatus which is of simplified construction and economical manufacture.

A miniature cassette receiving player apparatus incorporating the present invention includes a first means frictionally coupled to the supply turntable for rotation therewith when the player is conditioned for rewind operation. Second means are provided for coupling to said first means in a manner to inhibit rotation thereof when the player is conditioned for playback so as to cause a rotation retarding force to be produced by said first means acting on said supply turntable.

The novel features which are considered to be characteristic of this invention are set forth with particularity in the appended claims. The invention itself, however, both as to its organization and method of operation as well as additional objects and advantages thereof will best be understood from the following description when read in connection with the accompanying drawing in which:

Figure 1:
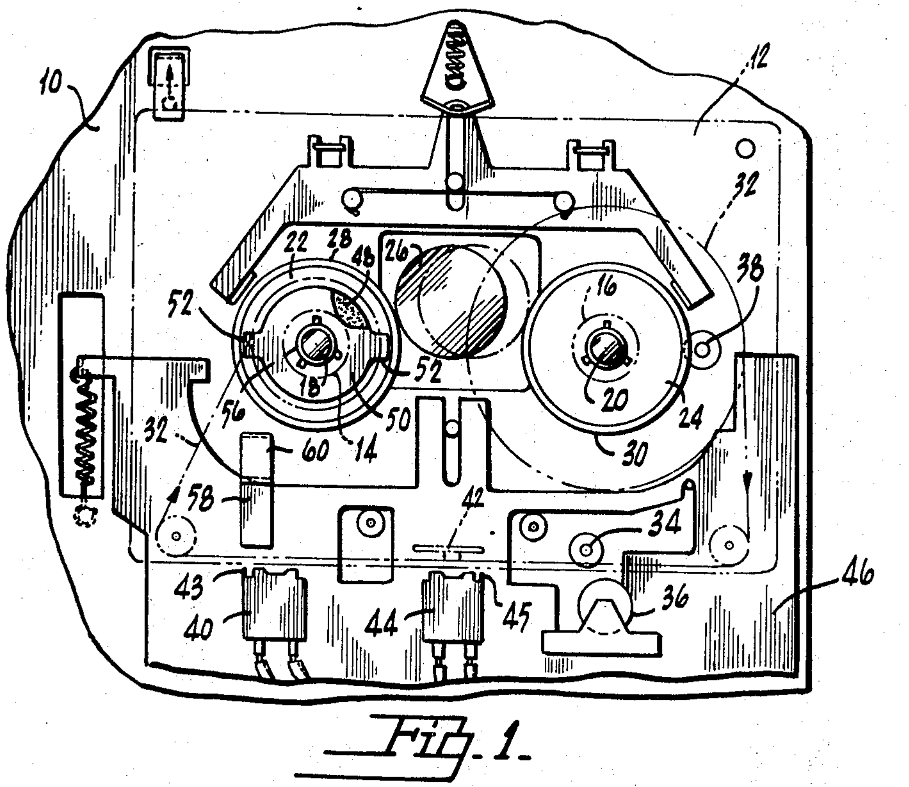
FIG. 1 is a partial plan view of a miniature cassette receiving tape player apparatus showing the position of the tape tensioning system of the present invention when the player is conditioned for fast forward or rewind operation.

Referring now to the drawing, a miniature cassette receiving tape player apparatus is shown assembled on a chassis or base plate 10. With a tape cassette 12 in place of the apparatus (as shown in phantom in FIGS. 1 and 3), the cassette's supply and takeup reels 14 and 16 are respectively received for rotation with and on spindles 18 and 20 upstanding from the player apparatus supply and takeup turntables 22 and 24 which are rotatably mounted above the base plate 10. During fast forward and rewind operation, rotative drive to either the takeup or supply turntables is provided by a drive hub 26 which is coupled to a motor-drive mechanism (not shown). For a rewind reeling operation, for example, the drive hub 26 is caused to be shifted to the left (as viewed in FIG. 1) so as to drivingly engage a rubber tire 28 secured to and surrounding the rim of the supply turntable 22. Conversely, for fast-forward reeling, the drive hub 26 is caused to be shifted to the right (as shown in phantom in FIG. 1) and its direction of rotation reversed so as to drivingly engage the tire portion 30 of the takeup turntable 24.

Figure 3:
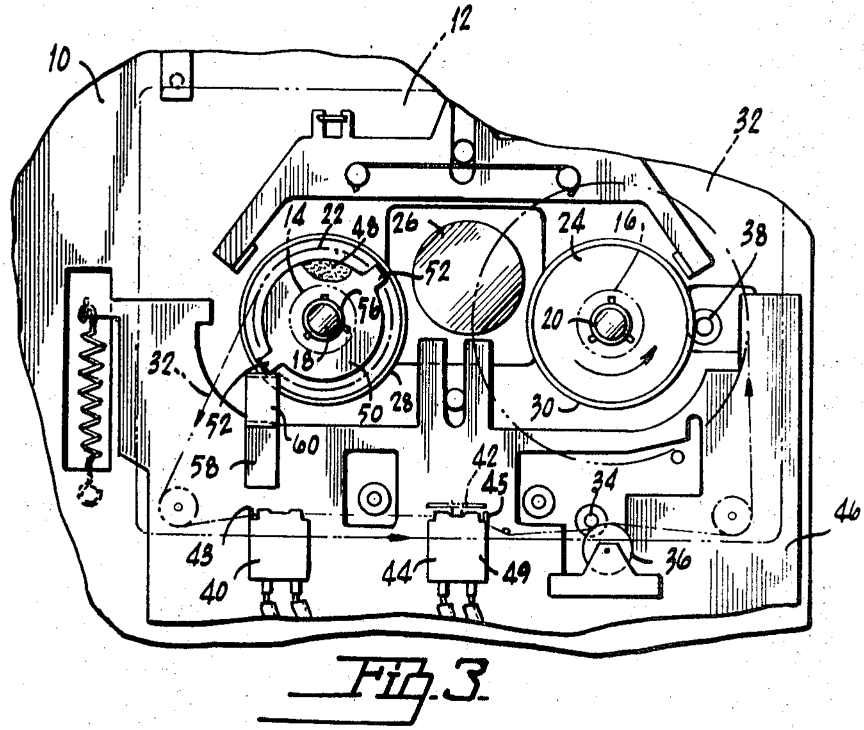
FIG. 3 is a partial plan view of the tape player apparatus showing the position of the tape tensioning system of the present invention when the player apparatus is conditioned for record or playback operation.

As shown in FIG. 3, during playback and record operation of the player apparatus, magnetic tape 32 is moved from the cassette's supply reel 14 to the takeup reel 16 by contact pressure between a driven capstan 34 and a pressure roller 36. Takeup tension on the takeup turntable 24 is effected by a coupling from the motor drive mechanism (not shown) to rotatively drive a hub 38 operating against the takeup turntable tire 30.

During tape reeling, the tape from the cassette's supply reel follows a path extending in front of the erase head 40, between the cassette pressure pad 42 and play-record head 44, then between the capstan 34 and pressure roller 36 and on to the takeup reel 16. Tape guides 43 and 45 are respectively formed on the leading edge of the erase head housing and the trailing edge of the play-record head housing. It will be noted however, that no tape guide is provided between the erase and play-record heads. The erase and play-record heads 40 and 44 are mounted on a shuttle plate 46 which is caused to remain in the position shown in FIG. 1 when the player apparatus is in its inoperative or "stop" codnition, or when conditioned for "fast forward" or "rewind" tape reeling operation. When the player apparatus is conditioned for "play" or "record" operation, the shuttle plate 46 is caused to be moved to the position shown in FIG. 3 by a mechanism (not shown) thereby to bring the erase and play-record heads into operative contact with the tape 32 and to urge it into contact with the capstan 34 to effect reeling of the tape at the desired speed.

The player apparatus thus far described is known in the art. Further details of construction and operation, including the motor drive system, mechanical couplings and electronic circuitry may conform to that which is shown and described in Tape Recorter Service Data—File 1967 No. 51—Model YJD 16, published by RCA Sales Coporation, 600 N. Sherman Drive, Indianapolis, Ind.

Referring again to the drawing, and in accordance with the present invention, an economical and simplified system for tensioning the tape withdrawn from the supply reel of the casette during record and playback operation will now be described.

An annular washer or pad 48 of a frictional material such as felt, cork, or the like is positioned on the top surface of the supply turntable 22 concentric with the supply spindle 18. A clutch plate in the form of a metal washer or disc 50 having one or more radially projecting ear portions 52 is mounted above the material washer 48. The disc 50 is biased against the washer 48 and the washer against the top surface of the supply turntable 22 by a spring 54 positioned on the spindle 18 beneath a collar 56. The spring force is such as to provide a rotational coupling and clutched engagement of the turntable 22, washer 48 and disc 50 so that when the player apparatus is operating in fast forward or rewind, the washers 48 and 50 rotate with the turntable 22.

Figure 2:
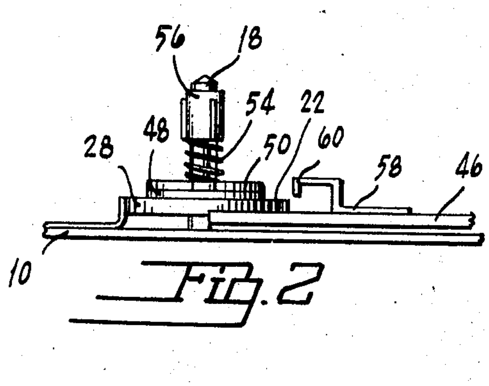
FIG. 2 is a partial elevation view taken from the left side of the tape player apparatus of FIG. 1.
Figure 4:
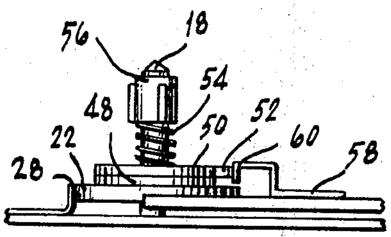
FIG. 4 is a partial elevation view of the apparatus of FIG. 3.

As shown more particularly in FIGS. 1 and 2, a member 58 having a projecting dog or tab portion 60 is fixedly mounted on the shuttle plate 46 such that the tab portion 60 is close to but sufficiently spaced from the supply turntable 22 so as not to come in contact with or be engaged by the ear portions 52 of the metal disc 50 when the player apparatus is operating in fast forward or rewind and the shuttle plate 46 is in the position shown in FIG. 1. When the player is conditioned for record or playback operation, the shuttle plate 46 is caused to move to the position shown in FIG. 3 so as to bring the erase and play-record head into operative contact with the tape 32. This movement of the shuttle plate 46 also brings the member tab portion 60 into engagement with one of the ear positions 52 of the metal disk 50 thereby inhibiting further rotation of the disc 50 and producing slippage in its clutched coupling with the material washer 48. Slippage between the clutched disk 50, washer 48 and turntable 22 causes a rotation retarding force or drag to be applied to or experienced by the supply turntable 22 supporting the cassettes supply reel 14 thereby effecting a tensioning of the tape withdrawn from the supply reel only during record and playback operation.

What is claimed is:

1. In a magnetic tape player of the type having rotatable supply and takeup means adapted to receive a reel to reel magnetic tape cassette, said player being conditionable for fast forward, rewind and playback tape reeling operations, the improvement comprising:

first means frictionally coupled to said supply means for rotation therewith when said player is conditioned for rewinding operation;

tions; and second means adapted to be coupled to said first means to inhibit rotation thereof when said player is conditioned for playback operation so as to cause a rotation retarding force to be produced by said first means acting on said supply means.

2. In a magnetic tape player of the type having rotatable supply and takeup means adapted to receive a reel to reel magnetic tape cassette, said player being conditionable for rewind and playback tape reeling operations, the improvement comprising:

first means frictionally coupled to said supply means for rotation therewith when said player is conditioned for rewinding operation;

second means adapted to be coupled to said first means to inhibit rotation thereof when said player is conditioned for playback operation so as to cause a rotation retarding force to be produced by said first means acting on said supply means;

said first means includes a friction pad member and a plate member in clutched engagement with said supply means for rotation therewith when said player is conditioned for rewind operation; and said second means includes a tab-like member movable to a position to intercept said plate member and inhibit rotation thereof when said player is conditioned for playback operation, thereby to product slippage between said clutched members and cause a rotation retarding force to be applied to said supply means.

3. In a magnetic tape player of the type adapted to receive a reel to reel magnetic tape cassette, said player being conditionable for fast forward, rewind, record and playback tape operations, the improvement comprising:

a supply turntable having a spindle adapted to engage the supply reel of a received reel to reel tape cassette;

a friction pad element mounted on said spindle in cooperative relation to said supply turntable;

a plate element rotatably mounted on said spindle in cooperative relation to said friction element;

spring means positioned on said spindle for exerting a bias against said plate and friction elements to couple said friction and plate elements to said supply turntable for rotation therewith; and means movable between a first position when said player is conditioned for one of fast forward and rewind operations and a second position when said player is conditioned for one of record and playback operations, said means in said second position being coupled to said plate element to inhibit rotation thereof and cause a rotation retarding force to be applied to said supply reel turntable.

4. A magnetic tape player as defined in claim 3 wherein said movable means is provided with a projecting tab portion and said plate element includes a projecting ear portion engageable with said tab portion only when said movable means is in said second position, thereby to inhibit rotation of said plate element.

5. In a magnetic tape player of the type adapted to receive a reel to reel magnetic tape casset, said player being conditionable for fast forward, rewind and playback tape operations, the improvement comprising:

a supply turntable;

a spindle mounted for rotatation with said supply turntable;

a collar slideable mounted on said spindle for rotation therewith;

a spring member positioned on said spindle for exerting a bias against said collar to urge said collar in a direction away from said turntable;

means movable between a first position when said player is conditioned for playback operation, and a second position when said player is conditioned for one of fast forward and rewind operations;

said means in said first position causing a frictional force to be applied to said turntable to inhibit rotation thereof; and said means in said second position causing said frictional force to be removed from said turntable to permit uninhibited rotation thereof.

References Cited

UNITED STATES PATENTS 2,611,618 9/1952 Camras ............ 274—8
2,712,448 7/1955 Schroter ............ 274—4

LEONARD D. CHRISTIAN, Primary Examiner

U.S. Cl. X.R.

274—11

UNITED STATES PATENT OFFICE
CERTIFICATE OF CORRECTION

Patent No. 3,532,293 Dated October 6, 1970

Inventor(s) Charles F. Rose

It is certified that error appears in the above-identified patent and that said Letters Patent are hereby corrected as shown below:

In Column 1, line 20, "inveition" should read -- invention --. In Column 2, line 66, "codnition" should read -- condition --. In Column 3, line 8, "Recorter" should read -- Recorder --; line 61, delete "rewinding operation" and insert -- one of fast forward and rewind operations --; line 62, delete "tions;" ; line 75, "rewinding" should read -- rewind --. In Column 4, line 13, "product" should read -- produce --; line 45, "casset" should read -- cassette --.

SIGNED AND SEALED DEC 22 1970

(SEAL)
Attest:

Edward M. Fletcher, Jr.
Attesting Officer

WILLIAM E. SCHUYLER, JR.
Commissioner of Patents